Figure 4:
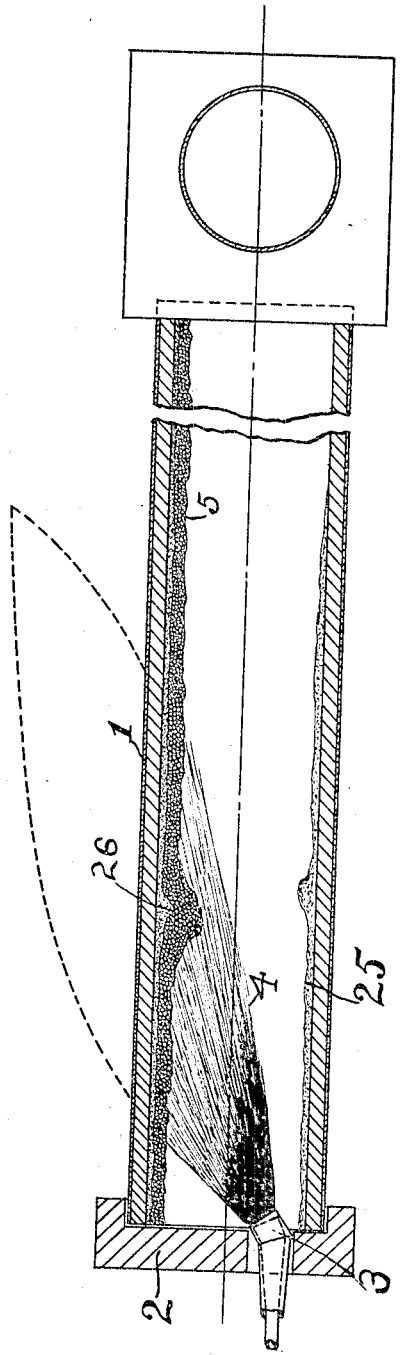

No. 844,857. PATENTED FEB. 19, 1907.
C. ELLIS.
PROCESS OF BURNING CEMENT AND APPARATUS THEREFOR.
APPLICATION FILED OCT. 11, 1906.
5 SHEETS—SHEET 1.
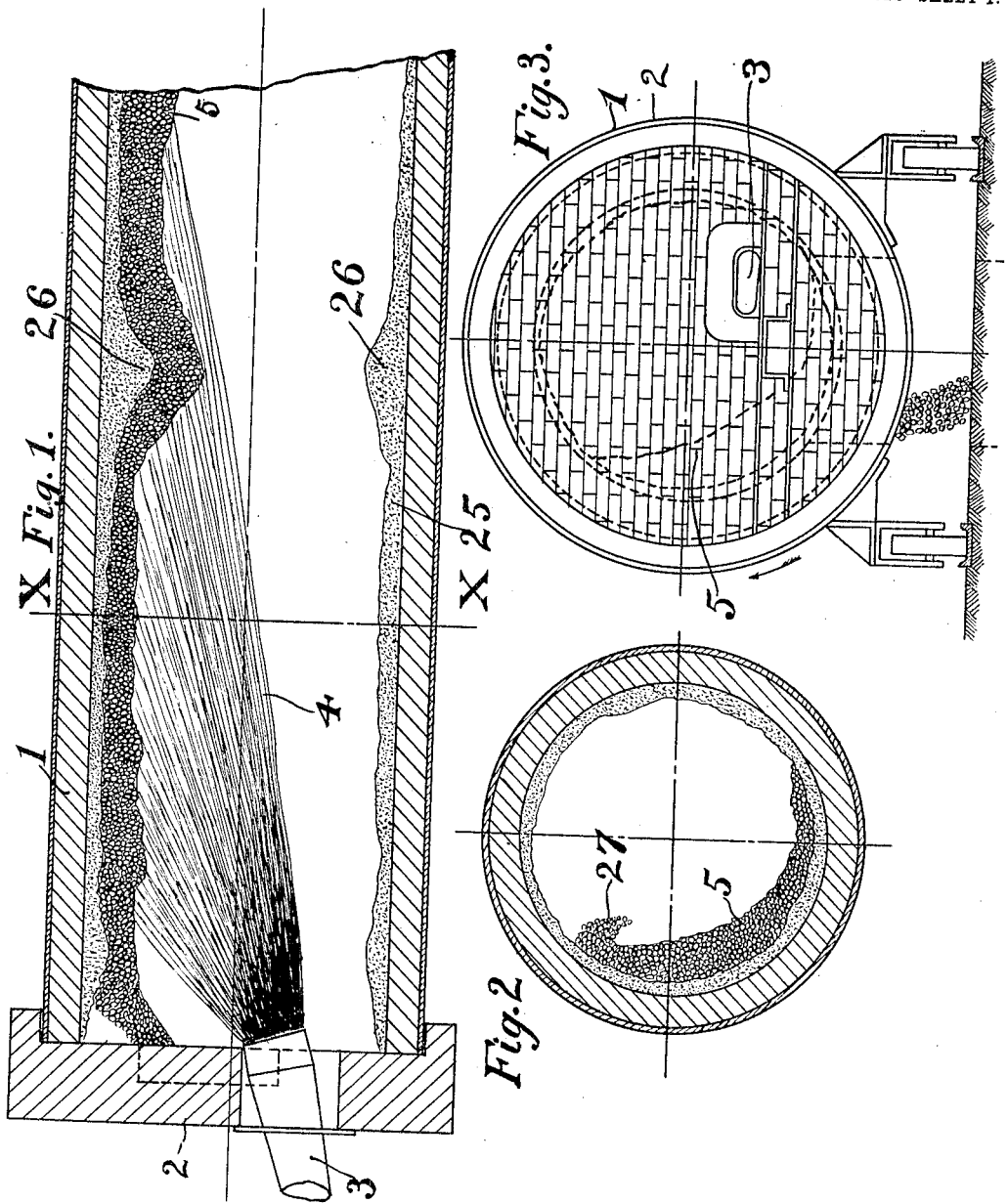
WITNESSES:
Edward Lester Kengla
Alfred M. Houghton
INVENTOR
Carleton Ellis
BY
Marble & McElroy
ATTORNEYS No. 844,857. PATENTED FEB. 19, 1907.
C. ELLIS.
PROCESS OF BURNING CEMENT AND APPARATUS THEREFOR.
APPLICATION FILED OCT. 11, 1906.

5 SHEETS—SHEET 2.

WITNESSES:
Edward Lester Kengla
Alfred M. Houghton

INVENTOR
Carleton Ellis,
BY
Marble & McElroy
ATTORNEYS

No. 844,857. PATENTED FEB. 19, 1907.
C. ELLIS.
PROCESS OF BURNING CEMENT AND APPARATUS THEREFOR.
APPLICATION FILED OCT. 11, 1906.
5 SHEETS—SHEET 3.
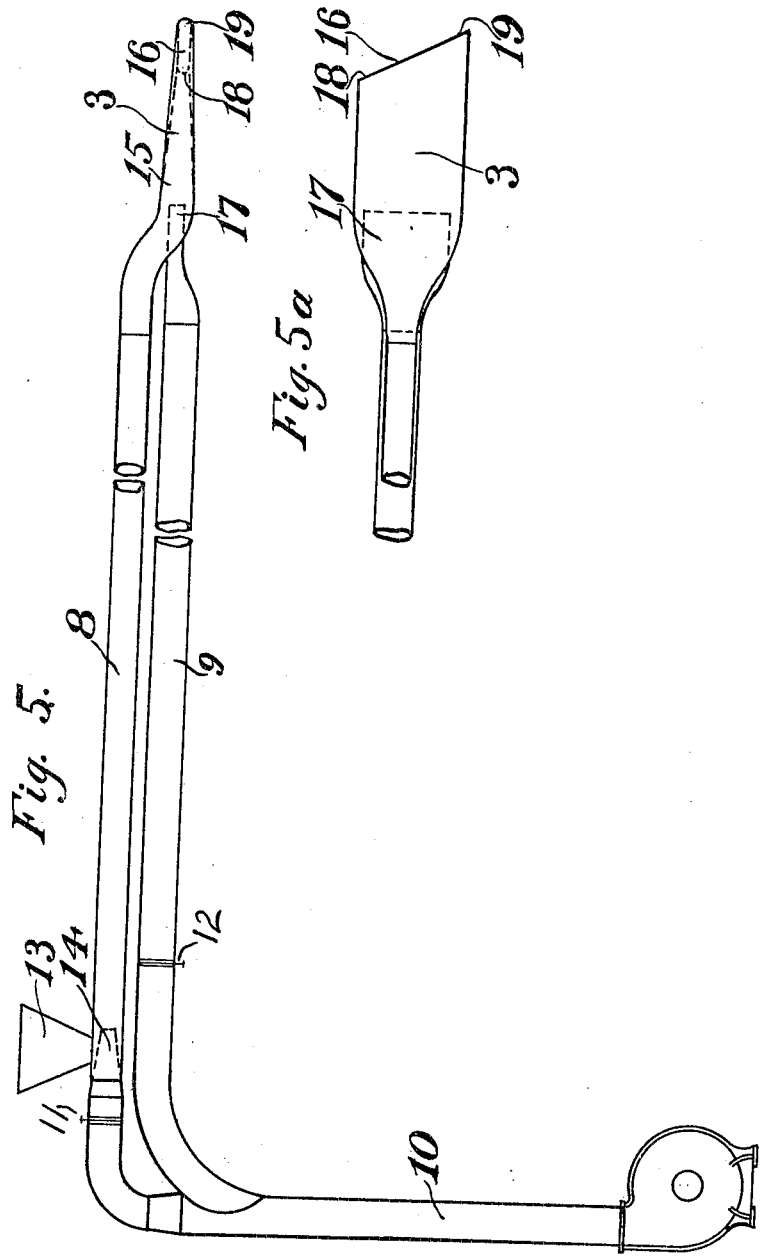

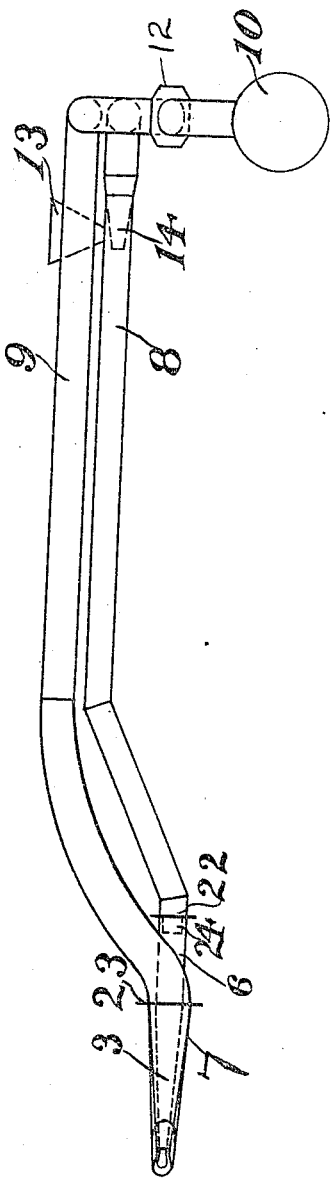
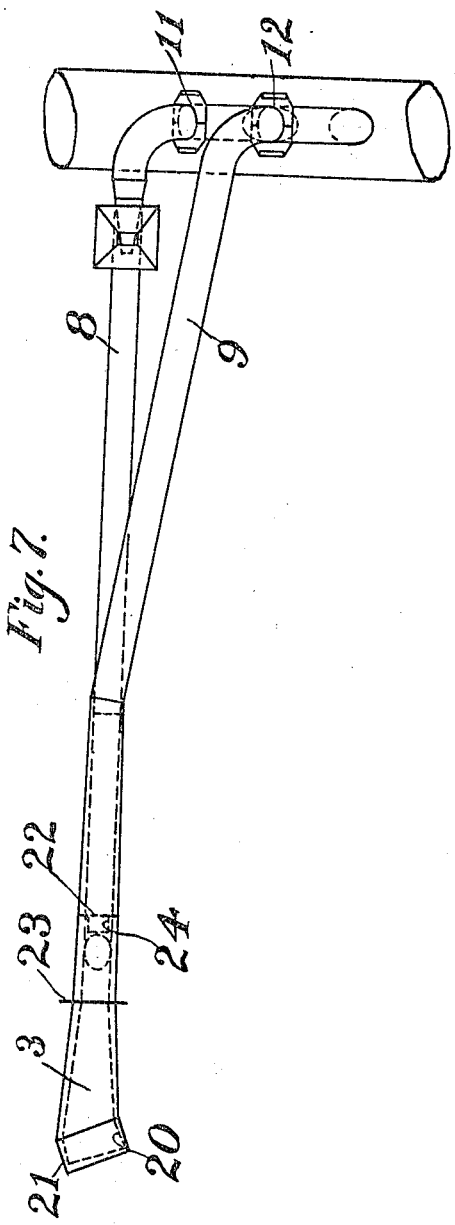

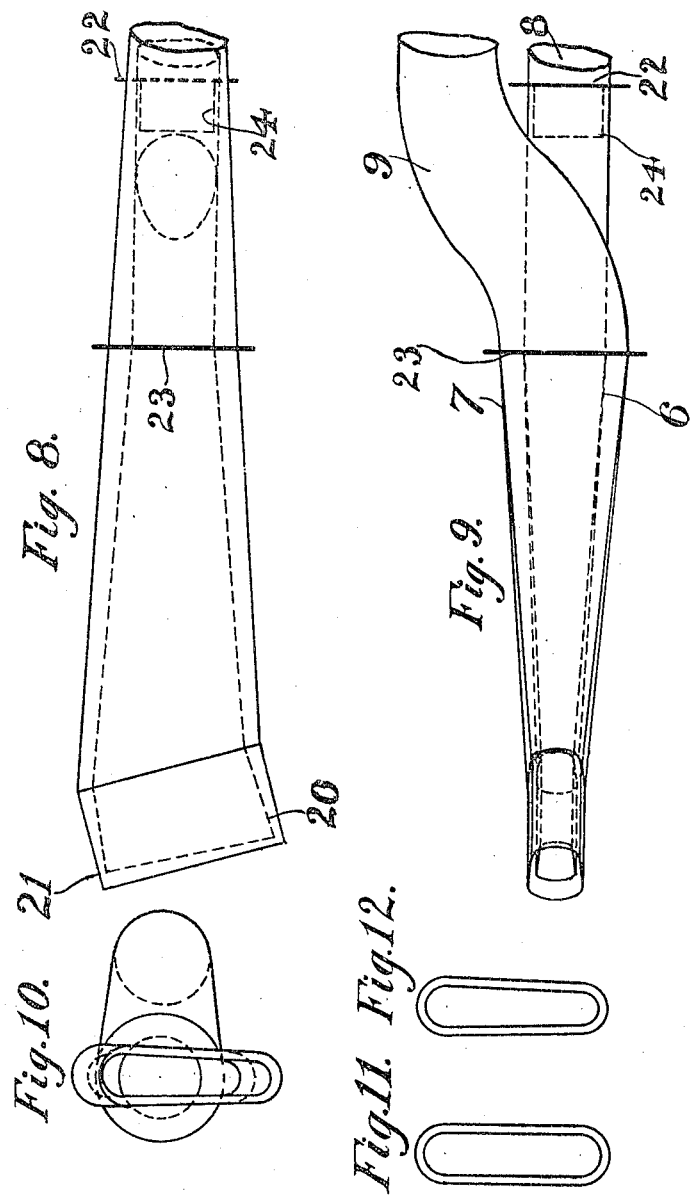

UNITED STATES PATENT OFFICE.

CARLETON ELLIS, OF WHITE PLAINS, NEW YORK, ASSIGNOR TO COMBUSTION UTILITIES COMPANY, OF NEW YORK, N. Y., A CORPORATION OF NEW YORK.

PROCESS OF BURNING CEMENT AND APPARATUS THEREFOR.

No. 844,857.          Specification of Letters Patent.          Patented Feb. 19, 1907.

Application filed October 11, 1906. Serial No. 338,398.

*To all whom it may concern:*

Be it known that I, CARLETON ELLIS, a citizen of the United States, residing at White Plains, in the county of Westchester and State of New York, have invented certain new and useful Improvements in Processes of Burning Cement and Apparatus Therefor; and I do hereby declare the following to be a full, clear, and exact description of the same, such as will enable others skilled in the art to which it appertains to make and use the same.

This invention relates to processes of burning cement and apparatus therefor, and consists in a method of operating rotary kilns for sintering cement materials and other materials sintering at high temperatures, such as iron ore and the like, and in apparatus for carrying out said method and others of like character, all as more fully hereinafter set forth and claimed.

According to the best modern practice of making Portland and like cements the cement-forming material is burned in inclined rotary barrel-kilns, through which the cement-forming material progresses slowly but continuously in heating relation to a flame projected from the lower end of the kiln, this flame being produced in most cases by the combustion of a jet of powdered coal. As the kiln rotates the material treated is carried up on the ascending side to a point where gravity causes it to fall or roll back to the bottom, each such falling or rolling back carrying the material part of the way toward the lower end of the kiln, owing to the inclination of the axis of the kiln. The same kilns and the same methods of heating are likewise applicable to the treatment of various other materials and to other processes involving the application of heat—for example, the treatment of iron ore for the purpose of sintering the same. The flame-jet of coal and air is usually introduced axially or nearly so, passing up the kiln in a direction substantially parallel to the surface of the stream of material passing down the kiln, and the air introduced with the coal is usually limited in amount, the rest of the air necessary for combustion entering by natural draft through the various orifices in and around the usual shielding-hood at the mouth.

Powdered coal in aerial suspension is one of the few cheap and available fuels capable of producing the excessively high temperature, long flame, and other heat conditions necessary for the sintering of cement materials, iron ores, and the like; but in free combustion without the use of special moderating conditions the temperature afforded by such an ordinary flame-jet of ordinary proportions is above the desired point and reaches a degree capable of injuring kiln-walls and producing other detrimental results. For this reason it has been common in the art to direct the flame with a view of avoiding substantial impingement or contact with the materials to be heated, and though in some cases the flame has been directed somewhat toward the side of the kiln with a view of radiating heat upon the material at short range care has been taken to avoid bringing it too close or in absolute contact therewith to avoid more than a slight or occasional impingement incidental to this purpose. Substantially, the flame is nearly parallel to the surface of the material. In using such an axial-flame jet an air-sheath about the flame formed by draft-currents entering in and around the hood and passing parallel with the walls of the kiln has been relied upon to prevent any direct or substantial impingement of the flame upon the material and to protect the lining of the kiln. Spacing the flame away from the material to be treated, however, is wasteful of fuel. Direct or positive impingement of the flame upon the material to be heated is more economical of fuel; but this has hitherto been deemed impractical by reason of the stated excessive flame-heat produced in prior methods of operating. Methods have been sought by which the action of the flame might be so tempered as to permit a direct or wide angle impingement on the material to be treated, one such method, permitting this, involving the tempering of the flame by mixing with the air-current of the flame-jet a tempering-gas, such as products of combustion, being set forth in the patent to Carleton Ellis, No. 827,517, dated July 31, 1906. According to the method described in said patent, the flame is directed with considerable force and at a considerable angle toward the side of the kiln and is directed in such manner as to permit an entire impingement on the material treated with no substantial impingement on the wall or lining of the kiln.

I have discovered that direct and positive impingement and combustion in and upon the cement material, together with safe clinkering conditions, can be obtained in other ways—as, for instance, by suitably varying the distribution of impingement, preferably by altering the shape of the flame to prevent chance of local overheating. Various means may be used to this end—for example, the end of the burner-nozzle may be so shaped as to distribute the flame longitudinally of the kiln-wall, so that distribution of the heat development caused by direct impingement may have only a desirable degree of localization, and, if desired, the heat development may be made approximately uniform along the region of impingement.

In practice I prefer to employ a thinned and broadened or flattened flame projected directly and strongly against the side of the kiln, so that there is no mere licking contact between the flame and the side of the kiln, but a strong positive impingement, which may be termed "end-on" impingement in contradistinction to licking action of flame. Thinning the jet serves to prevent local development of intense temperatures in any portion of such a flame-jet, and consequently the flame-jet may be directly impinged, end on, on the traveling stream of material without fear of local overheating of the same.

Generally speaking, within limits easily determined in practice, the thinner the jet the higher may be the angle of impingement. Consequently where the jet diverges from the nozzle at a considerable angle and its direction is such as to cause a considerable difference in the angle of impingement at various points taken sectionally across the same it is desirable to give the jet such shape that the flame will develop, so as to be thinner at the edge which impinges at the highest angle and of greater cross-section at points impinging at less angles. In all cases a tempering-gas in suitable proportion may be employed to prevent any tendency to intense localization of the heating effect upon the more exposed portions of the clinker or wall of the kiln. As is well known, this tempering action, preventing intense localized heat development, is an economical operation in so much as the resulting heated gases are better utilized in the calcining and drying operations farther on in the kiln. The endothermic reaction whereby the carbon dioxid ($CO_2$) contained in products of combustion used as tempering-gas combines with carbon and reduces to $CO$ upon development of excessive heat, thereby storing up heat units to be restored farther on by burning to $CO_2$, is also well understood.

Preferably the impingement is not only in the clinkering zone, but continues farther on into the calcining zone, a wide jet or succession of jets being used for this purpose, whereby the temperature change between calcining and clinkering zone may be made less abrupt than is usual, and thereby injurious formation of rings and other undesirable effects lessened. In this mode of operating the rear end of the flame or the rear flame, as the case may be, may, if desired, be differentially tempered. In such extension into the calcining zone the flattened flame may be and preferably is thicker at the rear end than at the fore end. In the calcining zone the endothermic action of the liberation of the carbon dioxid from a carbonate serves to counteract any high heat. In the usual arrangement of burners according to this invention such thicker or rear portion of the flame or rear flame will have traveled proportionately farther from the burner than the fore or thinner portion prior to impingement.

By practice of the above methods the flame may be so modified that direct impingement of the jet and combustion in intimate contact with the material may be economically accomplished without material impairment of the quality of the product or too great destructive action on the lining of the kiln. The effectiveness of impingement of the flame-jet may be increased by discharging therewith all or substantially all of the air necessary for combustion of its fuel and by decreasing or substantially doing away with protecting-sheaths or layers of air which otherwise would be drawn in by the natural draft in such a way as to follow the walls of the kiln parallel therewith. This positive injection of the air in known quantity and determined direction is particularly important with the thin flame of this invention, as the irregular natural-draft currents of the ordinary practice tend to cause distortion and irregularity of action of the flame, while, on the other hand, the relative thinness of the flame is particularly important in directing the full body of air with the coal, as thereby the undue development of heat which would naturally follow the intense combustion incident on supplying the full amount of air with the coal is restrained.

The effectiveness of impingement of the flame is preferably increased by increasing the volume of air of the flaming jet until the volume thus discharged in the kiln in the direction of the jet approximately satisfies the natural draft of the kiln, so that movements of air at peephole and clinker-discharge openings at the hood are small and preferably consist only of slight pulsations alternately outward and inward. The differential or resultant air movement should be rather inward than outward at the lower end of the kiln, though a slight normal outward movement at this point may be of advantage where suitable ventilating appliances are employed to properly discharge the small amount of gas which may issue in this way.

By this method there is practically no sheath of air moving parallel with the walls of the kiln, such as could materially decrease the effectiveness of impingement. The air movement is almost entirely in the direction of the jet, and thus reinforces its volume and velocity, carrying it unimpaired directly into end-on positive impingement with the clinkering material and the adjacent walls and into and among the fallen particles and masses of the material. Practically all of the clinkering material at some stage of its progress through the clinkering region falls directly through the flame-jet and is thus subject for greater or less time to a direct impingement of the flame at right angles to its exposed surface.

With a bladed flame of the character described the optical appearance of the edge impinging on the clinkering material is striking, since it appears to be attracted by the clinker sucked in among the fragments, and as the wide jet of coal and air moves across the kiln from the nozzle to the side of the kiln it appears comparatively dark for a considerable distance from the nozzle, losing this appearance when comparatively near impingement. Without wishing under the circumstances to commit myself to any theory, I at present regard it as probable that for most of the distance across the kiln the jet of coal and air is acting in a way like a gas-producers, that the primary gasification of the coal is taking place without much production of carbon dioxid, and that at the time of impingement the coal has been partly converted into combustible gas and partly reduced to extremely fine particles, and the flame becomes substantially a mass of burning gases and air, the temperature in which is probably lower than in an ordinary round-section coal-air flame, owing to the way the flame is spread out, and that as this mixture penetrates among the clinker fragments the glowing heat of the latter and their surface and catalytic action, together with agitation and mixing, due to impingement, suddenly and intensely heighten combustion, or, in other words, in this manner of operation the bulk of heat is actually developed in or on the clinkering mass. The flame so produced, carrying with it, as it does in most of the embodiments of my invention, all or substantially all the air necessary for the combustion of its fuel, and being directed into positive and direct impingement or cross-sectional engagement with the material, so to speak, boring in among its particles, may be termed a "positive" flame, in distinction to an ordinary coal-jet flame, the bulk of the air required for the combustion of which is supplied by the air-currents entering through the openings at the lower end of the kiln. With a thin flat flame such entering leakage-currents have a disturbing effect which it is desirable to avoid.

One serious trouble experienced in this art in the operation of inclined rotary kilns is the formation of so-called "rings," the result of excessive cumulative adhesion of softened and agglomerated material on the walls of the kiln. Commonly they tend to form toward the exit end of the kiln at or about the point where the softening of the material becomes prominent, and frequently they grow to such thickness as to interfere with the feeding of the material and even to stop up the kiln. By my invention tendency to ring formation may be lessened or may be controlled and turned to advantage by the action of the impinging flame, which is directed so as to impinge forcibly in the region at and about where softening of the material becomes prominent and at and about the level where the bulk of the tumbling material tends to drop off and fall back under the action of gravity. A suitably-directed flame impinging directly and continuously in this region tends to strip off any excess of adherent material, particularly in front of and at the region of incipient ring formation, so that commonly, though perhaps not invariably, the front side of any incipient ring is more or less exposed and may appear as a sort of shoulder, which as it emerges from the tumbling material seems to be swept free of excessive agglomerations. The location and thickness of any such shoulder, as well as the extent to which it is swept clear of adherent material, seems to depend upon the rate of feed and the composition of the material as well as upon the nature of the flame, the directness of impingement, and upon the region of the impingement as determined by the vertical adjustment. Sometimes the shoulder appears as little more than the termination of a more or less pronounced concavity in the upper part of the clinkering zone above the tumbling material. When the flame is directed upwardly and impinges in this region at or above the level of the axis of the kiln, the material seems to fall away more freely from the walls and the tumbling mass tends to lie lower down nearer the bottom of the kiln.

The modification of the flame, as by longitudinal spreading, vertical adjustment, and otherwise, may be such that the flame will have the intensity of impingement necessary for stripping off excess material, so as to maintain a desired thickness at the incipient ring or shoulder and yet will not have sufficient intensity to injure the walls at points in advance of the shoulder, where the layer of adhering material is thinner.

Where there is a shoulder of changing material continuously renewed by fresh agglomerations and kept within definite controlled limits by the impingement and stripping action of the flame, it affords a very considerable surface for direct and practically right-angle impingement of the flame. Such impingement tends to cause intensification of heat development; but the surface of the shoulder consists of continuously-changing material exposed only for short periods as it emerges from the tumbling mass of clinker, and it is more or less protected by adherent and falling masses, so that injurious effects on the material or on the walls of the kiln are minimized. On the other hand, the heat of the fuel is most economically applied, being evolved in intimate contact with the material, and the shoulder or incipient ring is kept down to useful proportions by the action of the flame. To secure the desired strong impingement of the flame against the side of the kiln, said flame is directed against the side of the kiln at an abrupt or wide angle, preferably from a point beyond the center of the kiln. The angle is preferably as near a right angle to the material and the kiln-wall as the limitations of the kiln structure permit, and upon the shoulder and the material therein it should also be as nearly a right-angle impingement as possible. The flame engages the material end-on, or, in other words, the tip of the flame plays in and among the fragmentary material, such material occupying what would be a cross-sectional line of the flame if the latter were normally developed, as shown in dotted lines in Fig. 4, and not intercepted by the kiln-wall.

I may use various forms of burners and in the drawings have illustrated and will hereinafter describe two burners which I may use. I do not limit myself, however, to any particular type of burner or to any particular means or method of producing the flat flame projected toward and into impingement with the side of the kiln as above and also hereinafter described.

In the accompanying drawings I illustrate apparatus comprising rotary kilns and burners for projecting jets of pulverized coal and air such as may be used in carrying out my said process.

In said drawings, Figure 1 shows diagrammatically a longitudinal section through a rotary kiln and indicates diagrammatically in a general way the action of the flame. Fig. 2 shows a transverse section of such a kiln and indicates in a general way how the material heated clings to the ascending side of the kiln. Fig. 3 shows an end view of the kiln. Fig. 4 is another diagrammatic longitudinal section of the kiln on a smaller scale than Fig. 1, showing the flame developed diagrammatically beyond the intercepting-wall of the kiln. Fig. 5 shows a diagrammatic side view of one form of apparatus for supplying coal and air to the flame, and Fig. 5ª shows a top view of the burner thereof. Fig. 6 shows a diagrammatic side view of another form of apparatus for supplying coal and air to the flame. Fig. 7 shows a top view thereof. Fig. 8 shows a top view of the burner of Figs. 6 and 7. Fig. 9 shows a side view of such burner. Fig. 10 shows an end view of the burner, and Figs. 11 and 12 show alternative shapes of burner-orifices which may be used.

In said drawings, 1 designates an ordinary rotary kiln, and 2 the housing or hood at the lower end thereof. These kilns are usually placed nearly horizontal, but slightly inclined, and are commonly termed "horizontal" kilns.

3 designates the burner arranged to project a flame-jet, such as hereinbefore described, toward and against the ascending side of said kiln and the material clinging thereto.

4 designates the flame, and 5 the stream of material flowing down the kiln and heated by said flame.

I may introduce all of the air with the coal or may introduce part of the air with the coal and the remainder in another jet, preferably concentric with and surrounding the coal-carrying jet. Coal-feeding apparatus and a burner of the first type is illustrated in Figs. 5 and 5ª, wherein 8 and 9 designate pipes to which air is supplied by a main 10. One of these pipes—for example 8—is provided with a hopper 13, through which pulverized coal, regularly supplied by any means commonly used for the purpose, may be introduced into pipe 8, and said pipe is further provided with an injection-nozzle 14, arranged to inject into said pipe 8 a jet of air which will pick up and carry forward the coal so introduced. Pipe 8 terminates in a burner-casing 15, having an orifice 16 of elongated flattened shape, as shown in dotted lines in Fig. 5, this orifice being preferably at a considerable angle to the axis of the burner, as indicated in Fig. 5ª. The cross-section of burner 15 merges gradually from the round shape of pipe 8 to a broad and flattened form and thence tapers gradually to the orifice 16. Pipe 9 terminates within the burner-casing 15 in a broadened and flattened injector-nozzle 17. In using this burner the jet of mingled coal and air is caused to issue from the burner at a speed greater than that of backward propagation of the flame in said jet, back firing being thereby prevented. Such quantity of air is fed through injector-nozzle 14 into pipe 8, as is best adapted to pick up the coal supplied through hopper 13 and start same in motion, the remaining air for combustion and for partial or complete satisfaction of the draft of the kiln being supplied through pipe 9. Since the distance from the burner to the nearest point of impingement of the flame on the side of the kiln is much shorter than the distance from said burner to the final point of impingement of the flame and also since less heat is required customarily at the extreme lower end of the kiln, it is desirable that the coal particles in the left-hand side of the flame (as viewed in Figs. 1 and 4)—i. e., those particles which form the initially-impinging portion of the flame—shall have slower travel than those particles of coal which are in the middle and right-hand portions of the flame, (as viewed in same figures.) I find that an exceedingly-effective method of giving the particles in the different portions of the flame the desired speed differences is to have the discharge-orifice of the burner at an angle to the axis of the burner, as indicated in Fig. 5ª, and also to make the width of the burner at 18 (on the "inner" side of the flame) less than on the "outer" side of the flame at 19. Owing to the sharp change of direction of the coal and air when passing from the burner to the said inner side of the flame and also to the reduced width of the burner-orifice on such inner side, the particles of coal leave such inner side with less velocity than those particles which left the outer side of the burner. I further find that the projecting outer side of the burner has an important effect in preventing spreading of the coal and the flame out toward the central axis of the kiln. In the other form of burner (illustrated in Figs. 6–12, inclusive) the pipe 8, containing the coal-carrying jet, terminates in a pipe 6, merging gradually from round to oval cross-section and tapering toward its orifice, and pipe 9 terminates in a pipe 7, of somewhat similar shape, outside of pipe 6, the air from pipe 9 flowing through the annular space between pipes 6 and 7. Pipes 6 and 7 terminate in end portions 20 and 21, turned toward the left—that is, toward the side of the kiln against which the flame is to be projected—and pipe 21, and particularly the outer side thereof, extends considerably beyond the end of the pipe 16, forming a species of hood, which serves the same purpose in preventing the scattering of the coal toward the center of the kiln on the outer side of the flame, as does the projecting outer side of the burner of Figs. 5 and 5ª. I commonly provide the burner with twist-joints 22 and 23, whereby the burner may be twisted slightly to change the angle of the flame, twist-joint 22 comprising a thimble 24, whereby pipe 8 (and its extension 6) may be adjusted longitudinally with respect to pipe 7. In operating this latter form of burner air is commonly supplied to pipe 9 at higher pressure than to pipe 8, and the outer annular air-stratum leaves the burner at higher velocity than the inner stratum. These strata moving at different velocities, but in contact, a swirling action is produced, which mixes the air of the outer stratum thoroughly with the coal of the inner stratum. As may be understood readily, the jet as it issues from either of these burners is broad and relatively thin as compared with its breadth.

I commonly place the opening in the lower hood 2, through which the burner works, beyond the center of the kiln, on the side thereof opposite that against which the flame is to be projected and somewhat below the center of the kiln. The initial angle of impingement—that is, the angle between the side of the kiln and the inner side of the flame—may be about forty-five degrees or thereabouts and the angle of impingement of the outer side of the flame with the side of the kiln may be about eighty degrees or thereabout. I do not limit myself to these angle of impingement, however, but prefer that the flame shall impinge within the limits of thirty and eighty degrees or thereabout.

In the drawings I have indicated diagrammatically, but without attempt to reproduce exact conditions in any one kiln, a characteristic way in which the material to be heated arranges itself while the kiln is in full operation. Before using the kiln it is customary to form a so-called "coating" on the sides of the kiln, said coating being formed of the cement-forming material, but being substantially fused on. This coating serves to protect the refractory lining of the kiln. In Figs. 1 and 4, 25 designates such coating.

26 in Figs. 1 and 4 indicates in a general way the tendency to the formation of an incipient ring or shoulder.

As the material to be heated passes through the kiln the most of it is usually against the ascending side of the kiln, the upper portions of the material continually breaking off and falling down, somewhat as indicated at 27, Fig. 2. It will be observed that the material as it falls or rolls down the side of the kiln passes directly through the flame, which at such times has substantially right-angle impingement thereon. The flame also impinged substantially at right angles against the projecting masses at and near the region of any incipient ring or shoulder. I commonly direct the flame in such manner that a portion of the flame impinges upon the side of the kiln above where the bulk of the material breaks away and find that by so doing the undue adhesion of the material at these points is prevented. Slight changes in the extent or intensity of the wall impingement, such as will result from slight changes of adjustment of the jet in vertical plane, produce marked changes in the stripping effect and the efficiency of the flame, the best results under given conditions being readily obtainable by trial. I have discovered that, other things being equal, the region referred to is a most favorable one for direct impingement of the flame, the good effects with a flaming jet of any given character being in general most pronounced and the tendencies to ill effects least pronounced when the impingement is in this region, and in this aspect my invention is not limited as to specific location, direction, or form of nozzle and piping, provided they be such as to give suitable impingement in such region.

As will be readily understood from the shape of the burner-orifices shown in the drawings, the flame is relatively thin near the point of initial impingement, but grows progressively thicker from that point upward through the kiln. The breadth of the area of impingement of the flame or the area covered by the flame after its positive forward direction is baffled by encounter with the material upon which it strikes is usually somewhat less than the breadth of the stream of material being heated, although the rolling or "mushrooming" of the flame upon impingement increases considerably the effective breadth of the area of direct action of the flame.

In Fig. 5 I indicate in dotted lines what would be approximately the shape of the flame beyond the kiln-walls if said flame were not intercepted by the kiln-walls. It will be seen that the wall of the kiln intercepts the flame from a point on one side of said flame not far from the base thereof to a point on the other side of the flame not far from the tip thereof. The upper portion of the flame commonly extends into the calcining region of the kiln and in contact with the material therein.

The method above described comprises several coördinate operations, each separately useful and all together coöperating to produce a thorough, effective, and controlled heating of the material treated and the thorough and complete sintering of all portions thereof; but while all of the described features of my invention mutually contribute to my desired useful result, and while if used together they mutually interact and modify the action the one of the other, my invention may yet be usefully employed with one or more features modified or omitted, and it will be understood that my claims are not limited to any features not specified therein.

In the following claims I have employed the term "physically-moderated flame" to designate a flame moderated by its physical characteristics, as hereinbefore described, as distinguished from a flame the action of which is tempered by admixture with it of a tempering medium, such as products of combustion or steam.

Within limits the rapidity of rotation of the kiln and the necessity of moderating the temperature of the directly-impinging jet playing on the material are reciprocally related—that is, the time-contact factor and development of heat in the zone of impingement are so related. Moderation of action of the impinging jet may also be effected otherwise than by sheer lateral spreading out of the impinging jet, and in general I may use any suitable means or method for moderating the action of the flame, as desired or required, or for p eventing excessive heating of the kiln. Introducing an excess of air with the fuel, for example, is one method of moderating the flame action which I may use.

I claim—

1. The process of sintering cement and like material in rotary kilns which consists in directly impinging end on upon a traveling stream of material in such kilns and in cross-sectional engagement with such material a physically-moderated flame-jet.

2. The process of sintering cement and like material in rotary kilns which consists in directly impinging on a traveling stream of material in such kilns the tip of a flattened jet of burning fuel in cross-sectional engagement with such material.

3. The process of sintering cement and like materials in horizontal kilns, which consists in passing a stream of the material to be heated through such a kiln and in introducing into such kiln and positively impinging upon said material a jet of mingled fuel and air, the draft of the kiln being approximately satisfied by the air and fuel so introduced and entrance of insulating air-currents being thereby substantially avoided.

4. The process of sintering cement and like materials in horizontal kilns, which consists in passing a stream of the material to be heated through such a kiln and in impinging directly and positively upon such material fuel and air in the form of a flame-jet and in quantity sufficient to approximately satisfy the draft of the kiln, whereby an insulating air-stream intermediate the flame and the material to be heated is substantially avoided.

5. The process of sintering cement and like materials in horizontal kilns, which consists in passing a stream of the material to be heated through such a kiln and in impinging directly and positively upon such stream fuel and air in the form of a flame-jet and in quantity sufficient to produce a plenum.

6. The process of sintering cement and like material in horizontal rotary kilns, which consists in passing a stream of the material to be heated through such a kiln and in positively impinging both upon the side of the kiln and upon the material adjacent thereto a flame-jet comprising fuel and air in quantity sufficient to approximately satisfy the draft of the kiln.

7. The process of sintering cement and like materials in horizontal rotary kilns, which consists in passing a stream of the material to be heated through such a kiln and in positively impinging both upon the side of the kiln and the material adjacent thereto a flame-jet comprising pulverulent fuel and air in quantity sufficient to approximately satisfy the draft of the kiln.

8. The process of sintering cement and like materials in horizontal rotary kilns, which consists in passing a stream of the material to be heated through such a kiln and in impinging end on upon the side of the kiln and the material covering the same a flame-jet comprising fuel and air in quantity sufficient to substantially neutralize any tendency for other air-currents to enter the kiln.

9. The process of sintering cement and like materials in horizontal kilns, which consists in passing a stream of the material to be heated through such a kiln and in introducing into such kiln fuel and air in the form of a flame-jet and in quantity sufficient to substantially neutralize any tendency for other air-currents to enter the kiln, and positively impinging said jet upon the side of the kiln.

10. The process of sintering cement and like materials in horizontal kilns, which consists in passing a stream of the material to be heated through such a kiln and in introducing into and burning in such kiln fuel and air in quantity sufficient to substantially neutralize any tendency for other air-currents to enter the kiln, all said air being introduced positively with the fuel.

11. The process of sintering cement and like materials in horizontal rotary kilns, which consists in passing a stream of the material to be heated through such a kiln and in positively impinging end on against such stream and against the ascending wall of the kiln above the normal limit of such stream a flame-jet.

12. The process of sintering cement and like materials in horizontal rotary kilns, which consists in passing a stream of the material to be heated through such a kiln and in positively impinging both against such stream and against the ascending wall of the kiln above the normal limit of such stream a flame-jet the zone of impingement of which approximates in width the width of said stream.

13. In the heating in horizontal rotary kilns of materials which soften with heat, the method of preventing unduly-prolonged adhesion of the material to the wall of the kiln which consists in exposing the wall of the kiln at a point above where said material should drop away, to the direct action of a flame directed end on.

14. In the heating in horizontal rotary kilns of materials which soften with heat, the method of preventing unduly-prolonged adhesion of the material to the wall of the kiln which consists in projecting a flame-jet end on against the wall of the kiln above where said material should drop away.

15. The process of sintering cement and like materials in horizontal kilns, which consists in passing a stream of the material to be heated through such a kiln and in impinging against such stream obliquely and end on in full cross-sectional engagement with such stream a flame-jet spread out into fan shape to moderate its action.

16. The process of sintering cement and like materials in horizontal rotary kilns, which consists in passing a stream of the material to be heated through such a kiln and in impinging obliquely both against the ascending side of the kiln and the material adhering thereto a flame-jet spread out into fan shape, the major axis of cross-section of said flame being nearly horizontal.

17. The process of sintering cement and like materials in horizontal rotary kilns, which consists in passing a stream of the material to be heated through such a kiln and in impinging obliquely both against the ascending side of the kiln and the material adhering thereto a flame-jet comprising a mixture of air and pulverulent fuel in suspension, such jet spread out into fan shape and impinging edgewise, the major axis of cross-section of said flame being nearly horizontal.

18. The process of sintering cement and like materials in horizontal rotary kilns, which consists in passing a stream of the material to be heated through such kiln and in impinging obliquely and positively both against the ascending side of the kiln and the material adhering thereto a flame comprising a mixture of air and fuel, said jet spread out into fan shape, the major axis of cross-section of said flame being nearly horizontal, said air and fuel supplied in quantity to substantially neutralize tendency for other air-currents to enter the kiln near the point where said flame is introduced.

19. The process of sintering cement and like materials in horizontal kilns, which consists in passing a stream of the material to be heated through such a kiln and in projecting into said kiln obliquely to the axis thereof and causing to impinge against such stream obliquely and in cross-sectional engagement therewith a flame-jet comprising a mixture of air and pulverulent fuel in suspension, such jet spread out into fan shape to moderate its action and impinging end on.

20. The process of sintering cement and like materials in horizontal kilns, which consists in passing a stream of the material to be heated through such a kiln and in projecting into said kiln obliquely to the axis thereof and causing to impinge against such stream obliquely in cross-sectional engagement therewith but positively a flame-jet comprising a mixture of air and pulverulent fuel in suspension, such jet spread out into fan shape to moderate its action, said air and fuel supplied in quantity sufficient to approximately neutralize tendency for other air-currents to enter the kiln near the point where said flame is introduced.

21. The process of sintering cement and like materials in horizontal rotary kilns, which consists in passing a stream of the material to be heated through such a kiln and in projecting into said kiln obliquely to the axis thereof and causing to impinge obliquely against the upturning side of the kiln and the material adhering thereto, and upon the wall of the kiln above the normal limit of such stream, a flame-jet spread out into fan shape and impinging end on, the major axis of cross-section of said flame being nearly horizontal.

22. The process of sintering cement and like materials in horizontal rotary kilns, which consists in passing a stream of the material to be heated through such a kiln and in directly impinging a flame end on against such stream of material at the side of the kiln, the mean angle of impingement being between eighty degrees and thirty degrees approximately.

23. The process of sintering cement and like materials in horizontal rotary kilns, which consists in passing a stream of the material to be heated through such a kiln and in positively impinging a flame end on against such stream of material at the side of the kiln, the mean angle of impingement being between sixty degrees and forty-five degrees approximately.

24. The process of sintering cement and like materials in horizontal rotary kilns, which consists in passing a stream of the material to be heated through such a kiln and in positively impinging a flame end on against such stream of material at the side of the kiln, the angle of initial impingement being approximately forty-five degrees.

25. The process of sintering cement and like materials in horizontal rotary kilns, which consists in projecting a flame-plume toward one wall of such a kiln from a point below the axis and upon the opposite side of the center of the kiln, and causing it to impinge on said side.

26. The process of sintering cement and like materials in rotary horizontal kilns, which consists in projecting a flame-jet of fan shape, toward one side of such a kiln from a point below the axis of such kiln and upon the opposite side of the center thereof, and causing said flame to impinge upon said side of the kiln, the major axis of cross-section of said flame being nearly horizontal.

27. The process of sintering cement in rotary kilns which consists in directly impinging a flattened flame-jet end on against the stream of material traveling therethrough and against the shoulder formed at the line between calcining and clinkering zones.

28. The process of forming cement-clinker which consists in directly impinging a flame-jet end on against the stream of material traveling therethrough and against and across the shoulder formed at the line between calcining and clinkering zones for a substantial distance into said calcining zone.

29. The process of sintering cement and like materials in rotary kilns, which consists in passing a stream of the material to be heated through such a kiln and in impinging a flame-sheet end on against said stream and in cross-sectional engagement therewith.

30. The combination with a horizontal rotary kiln, of a burner therefor located at a point below and to one side of the axis of said kiln and directed toward the opposite side of said kiln.

31. The combination with a horizontal rotary kiln, of a flattened burner therefor located at a point to one side of the axis of said kiln and directed toward the opposite side of said kiln.

32. The combination, with a horizontal rotary kiln, of a burner therefor located at a point to one side of the axis of said kiln and directed toward the opposite side of said kiln, said burner arranged to produce a flame-jet of wide spread in an approximately horizontal plane and of relatively little spread in a plane at right angles.

33. The combination, with a horizontal rotary kiln, of a burner therefor located at a point below and to one side of the axis of said kiln and directed toward the opposite side of said kiln, said burner arranged to produce a flame-jet of wide spread in an approximately horizontal plane and of relatively little spread in a plane at right angles.

34. The combination, with a horizontal rotary kiln, of a burner arranged to project a flame-jet toward one wall of said kiln at a considerable angle and into positive engagement with said wall, said burner having orifice which is relatively long in a nearly horizontal direction and is relatively narrow in a nearly vertical direction.

35. The combination, with a horizontal rotary kiln, of a burner arranged to project a flame-jet toward one wall of said kiln at a considerable angle and into positive engagement therewith, said burner directed to cause the upper border of said flame to impinge positively on the kiln-wall above the normal line of separation of the material heated.

36. The combination, with a horizontal rotary cement-kiln, of a burner directed to project a flame-jet against and into positive engagement with the ascending wall of said kiln at a point above the normal line of separation of the material heated.

37. The combination, with a horizontal rotary cement-kiln, of a burner directed to project a flame-jet against and into positive engagement with the material heated and the ascending wall of said kiln at a point above the normal line of separation of the material heated.

38. The combination, with a horizontal rotary cement-kiln, of a burner directed to project a flattened flame-jet toward one side of the kiln and at an oblique angle with respect to the kiln-axis, said burner having an outward-projecting extension at the outer side of its flame-orifice.

39. The combination, with a horizontal rotary cement-kiln, of a burner directed to project a flattened flame-jet toward one side of the kiln and at an oblique angle with respect to the kiln-axis, said burner having a projecting hood on the outer side of the discharge-orifice, preventing excessive spreading of the outer side of the flame.

40. The combination, with a horizontal rotary cement-kiln, of a burner directed to project a flattened flame-jet toward one side of the kiln and at an oblique angle with respect to the kiln-axis, said burner comprising inner and outer tubes, the outer tube extending beyond the inner tube and having a projecting hood on the outer side of its discharge-orifice preventing excessive spreading of the outer side of the flame.

41. The combination, with a horizontal rotary cement-kiln, of a burner directed to project a flattened flame-jet toward one side of the kiln and at an oblique angle with respect to the kiln-axis, said burner comprising inner and outer tubes, the former longitudinally adjustable with respect to the latter.

42. The combination, with a horizontal rotary cement-kiln, of a burner directed to project a flattened flame-jet toward one side of the kiln into positive engagement therewith at an oblique angle with respect to the kiln-axis, said burner comprising inner and outer tubes, the outer tube extending beyond the inner tube and having a projecting hood on the outer side of its discharge-orifice preventing excessive spreading of the outer side of the flame, the inner tube longitudinally adjustable with respect to the outer tube 43. The combination, with a horizontal rotary cement-kiln, of a burner directed to project a flattened flame-jet toward one side of the kiln into positive engagement therewith at an oblique angle with respect to the kiln-axis, the discharge-orifice of said burner being oblique with respect to the axis of the burner and set to project the flame-jet in cross-sectional engagement with the side of the kiln and the material thereon.

44. The combination, with a horizontal rotary cement-kiln, of a burner directed to project a flattened flame-jet toward one side of the kiln into positive engagement therewith on a cross-section of such flame-jet at an oblique angle with respect to the kiln-axis, said burner having a discharge-orifice relatively long in one direction and narrow in the opposite direction.

45. The combination, with a horizontal rotary cement-kiln, of a burner directed to project a flattened flame-jet toward one side of the kiln into positive engagement therewith on a cross-section of such flame-jet at an oblique angle with respect to the kiln-axis, said burner having a discharge-orifice relatively long in one direction and narrow in the opposite direction, and arranged obliquely with respect to the burner-axis.

46. The combination, with a horizontal rotary cement-kiln, of a burner directed to project a flattened flame-jet toward one side of the kiln and at an oblique angle with respect to the kiln-axis, said burner having a discharge-orifice relatively long in one direction and narrow in the opposite direction, and arranged obliquely with respect to the burner-axis, said orifice narrower at its inner side than at its outer side.

47. The combination, with a horizontal rotary cement-kiln, of a burner directed to project a flattened flame-jet toward one side of the kiln and at an oblique angle with respect to the kiln-axis, said burner comprising inner and outer tubes, bent abruptly to one side near their discharge-orifices.

48. The combination, with a horizontal rotary cement-kiln, of a burner directed to project a flame-jet against and into positive engagement with the line of normal separation of the material heated from the kiln-wall.

49. The combination, with a horizontal rotary cement-kiln, of a burner directed to project a positively-impinging flame-jet both against the material heated and against the ascending wall of the kiln.

In testimony whereof I affix my signature in the presence of two witnesses.

CARLETON ELLIS.

Witnesses:
ROGER H. LYON,
H. M. MARBLE.